United States Patent
Itaya

4,212,515
Jul. 15, 1980

[54] WIDE-VISUAL-FIELD MICROSCOPE OBJECTIVE LENS SYSTEM

[75] Inventor: Hideo Itaya, Hachiouji, Japan

[73] Assignee: Olympus Optical Company Limited, Tokyo, Japan

[21] Appl. No.: 884,551

[22] Filed: Mar. 8, 1978

[30] Foreign Application Priority Data

Mar. 14, 1977 [JP] Japan .................................. 52-27699

[51] Int. Cl.$^2$ .............................................. G02B 21/02
[52] U.S. Cl. ............................................. 350/175 ML
[58] Field of Search ......................... 350/175 ML, 216

[56] References Cited
U.S. PATENT DOCUMENTS

4,037,934   7/1977   Matsubara .................... 350/175 ML

FOREIGN PATENT DOCUMENTS

1280569   7/1963   Fed. Rep. of Germany.

*Primary Examiner*—Conrad J. Clark
*Attorney, Agent, or Firm*—Cushman, Darby & Cushman

[57] ABSTRACT

A microscope objective lens system which has a long working distance and wherein image plane is flat over a wide visual field and various aberrations are favorably corrected, and said lens system comprising a first negative meniscus lens component, a second positive lens component, a third positive cemented lens component, a fourth positive lens component and a fifth negative cemented lens component.

4 Claims, 6 Drawing Figures

WIDE-VISUAL-FIELD MICROSCOPE OBJECTIVE LENS SYSTEM

BACKGROUND OF THE INVENTION (a) Field of the Invention

The present invention relates to a plan achromat microscope objective lens system of medium magnification.

(b) Description of the Prior Art

There have generally been known objective lens systems which comprise thick meniscus lens components on the front and rear sides for flattening image plane and minimizing Petzval's sum of the lens systems as a whole. Such objective lens systems have long working distances (WD). However, the front lens group comprising a thick meniscus lens component on the object side unavoidably has a total focal length which is longer than that of a front lens group in an ordinary microscope objective lens system comprising no thick meniscus lens component. In the former type objective lens system, residual amount of longitudinal chromatic aberration in the front lens group increases almost proportionally to the focal length of the front lens group.

Further, the thick meniscus lens components arranged on the front and rear sides of the lens system have a common nature to remarkably aggravate longitudinal chromatic aberration and lateral chromatic aberration both in themselves and the entire lens system. In a lens system having such a composition, the thick meniscus lens components arranged on the front and rear sides result in undercorrection of astigmatism and overcorrection of distortion in addition to increase in chromatic aberration mentioned above.

SUMMARY OF THE INVENTION

A general object of the present invention is to provide a high resolution objective lens system which has a working distance (WD) far longer than that of the conventional objective lens systems, an image plane which is sufficiently flat over a wide visual field and wherein chromatic aberration is favorably corrected.

The objective lens system according to the present invention comprises a front lens group A which comprises a first negative meniscus lens component $L_1$, a second positive lens component $L_2$ and a third positive cemented lens component $L_3$, and a rear lens group B which comprises a fourth positive lens component and a fifth negative cemented lens component $L_5$, and said lens system satisfying the following conditions:

(1) $2.8f \leq d_7$
(2) $0.3f \leq |r_1| \leq 0.45f$
(3) $0.85f \leq |r_{12}| \leq 1.2f$
(4) $0.8f \leq f_A \leq 1.25f$ wherein the reference symbols represent as defined below:

$f$: focal length of the entire lens system as a whole
$f_A$: focal length of the front lens group
$d_7$: airspace between the front and rear lens groups
$r_1$: radius of curvature on the object side surface of the first lens component $L_1$
$r_{12}$: radius of curvature on the image side surface of the fifth lens component $L_5$ Distortion does not pose any practical problems for objective lens systems for microscopes since they generally have narrow real vidual fields and small image plane accordingly.

In the objective lens system according to the present invention, thick meniscus lens components are arranged on the front and rear sides for flatening image plane. Astigmatism is corrected by bending of the lenses. Chromatic aberration is prevented by designing the front lens group A so as not to have a long focal length. Further, a cemented surface is formed in the front lens group (by forming a cemented surface in the third lens component $L_3$) for correcting chromatic aberration in the front lens group, and in addition, another cemented surface is formed in the fifth lens component $L_5$ of the rear lens group B for sufficiently correcting residual chromatic aberration.

The condition (1) is selected for making it possible to correct asymmetrical coma by reserving a sufficiently wide airspace $d_7$ between the front and rear lens groups A and B, and further for correcting chromatic aberration. When $d_7$ is narrower than the lower limit defined by the condition (1), both coma and chromatic aberration will therefore be aggravated.

The condition (2) is required for correcting aberrations while maintaining favorable flatness of image plane. If $|r_1|$ is smaller than the lower limit of the condition (2), coma will be aggravated, and a working distance (WD) sufficiently long will be apt to produce spherical aberration. If $|r_1|$ exceeds the upper limit of the condition (2), in contrast, too heavy a burden is imposed to the image side surface of the fifth lens component $L_5$ to correct curvature of field, thereby making it impossible to correct coma.

The condition (3) is necessary for correcting astigmatism and offaxial coma, and its upper limit defines the limit to correct astigmatism and coma. If $|r_{12}|$ exceeds the upper limit, it will be difficult to correct astigmatism and coma. If $|r_{12}|$ is smaller than the lower limit of the condition (3), in contrast, astigmatism and coma will be overcorrected.

The condition (4) is adopted in order to correct spherical aberration and chromatic aberration. If the total focal length $f_A$ of the front lens group A is shorter than the lower limit of the condition (4), it will be too short to properly balance power between the front and rear lens groups and unfavorable for correcting aberrations, thereby aggravating spherical aberration. Since longitudinal and lateral chromatic aberrations are aggravated proportionally to the focal length of the front lens group A, on the other hand, it is required to shorten the focal length of the front lens group A. Therefore, chromatic aberration will be aggravated when focal length $f_A$ exceeds the upper limit of the condition (4).

Chromatic aberration can further be corrected effectively and the secondary spectrum will be minimized by forming at least one comented surface in each of the front lens group A and the rear lens group B, and selecting a lowly dispersive glass ($\nu \geq 80$) which has high extraordinary dispersive power as material for at least one of the lens component $L_2$, the image side lens element of the cemented component $L_3$, the positive lens component $L_4$ and the object side lens element of the cemented lens component $L_5$. It will be possible to correct chromatic aberration further favorably if a relationship of $$2.0 \leq \frac{\Sigma v_F}{\Sigma v_B} \leq 5.2$$

is satisfied:

$\Sigma v_F$: a total of the differences in Abbe's numbers between respective pairs of lens elements located on both sides of at least one cemented surface in the front lens group $\Sigma v_B$: total of the differences in Abbe's numbers between respective pairs of lens elements arranged on both side of at least one cemented surface in the rear lens group.

The above mentioned relashionship is satisfied by the embodiments preferred for describing practical manners of application of the present invention.

DETAILED DESCRIPTION OF THE PREFERRED EMBODIMENTS

Now, some preferred embodiments of the microscope objective lens system according to the present invention will be described detailedly below:

Embodiment 1
$\beta = 20X$, $NA = 0.46$, $WD = 0.2422$, $f = 1$, $f_4 = 1.131$
$r_1 = -0.3728$
$\quad d_1 = 0.6951 \quad n_1 = 1.7725 \quad v_1 = 49.6$
$r_2 = -0.7076$
$\quad d_2 = 0.0113$
$r_3 = 30.7899$
$\quad d_3 = 0.2105 \quad n_2 = 1.497 \quad v_2 = 81.6$
$r_4 = -1.0993$
$\quad d_4 = 0.0100$
$r_5 = 3.6804$
$\quad d_5 = 0.1155 \quad n_3 = 1.7618 \quad v_3 = 27.11$
$r_6 = 1.1203$
$\quad d_6 = 0.3145 \quad n_4 = 1.497 \quad v_4 = 81.6$
$r_7 = -4.9268$
$\quad d_7 = 3.1525$
$r_8 = 4.9513$
$\quad d_8 = 0.3014 \quad n_5 = 1.497 \quad v_5 = 81.6$
$r_9 = -3.0944$
$\quad d_9 = 0.0628$
$r_{10} = 2.5059$
$\quad d_{10} = 0.5401 \quad n_6 = 1.6779 \quad v_6 = 55.33$
$r_{11} = -86.2812$
$\quad d_{11} = 0.3111 \quad n_7 = 1.6134 \quad v_7 = 43.84$
$r_{12} = 1.0903$ Embodiment 2
$\beta = 20X$, $NA = 0.46$, $WD = 0.2399$, $f = 1$, $f_4 = 1.176$
$r_1 = -0.3237$
$\quad d_1 = 0.6218 \quad n_1 = 1.618 \quad v_1 = 63.38$
$r_2 = -0.6681$
$\quad d_2 = 0.0113$
$r_3 = -10.5599$
$\quad d_3 = 0.2113 \quad n_2 = 1.618 \quad v_2 = 63.38$
$r_4 = -1.0320$
$\quad d_4 = 0.0088$
$r_5 = 4.9815$
$\quad d_5 = 0.1157 \quad n_3 = 1.7618 \quad v_3 = 27.11$
$r_6 = 1.1995$
$\quad d_6 = 0.3145 \quad n_4 = 1.4925 \quad v_4 = 81.9$
$r_7 = -2.6466$
$\quad d_7 = 3.6281$
$r_8 = 5.1483$
$\quad d_8 = 0.3019 \quad n_5 = 1.66672 \quad v_5 = 48.32$
$r_9 = -3.6598$
$\quad d_9 = 0.2126$
$r_{10} = 2.1028$
$\quad d_{10} = 0.4076 \quad n_6 = 1.58913 \quad v_6 = 61.11$
$r_{11} = -4.2073$
$\quad d_{11} = 0.3120 \quad n_7 = 1.68065 \quad v_7 = 37.39$
$r_{12} = 1.1062$ Embodiment 3
$\beta = 20X$, $NA = 0.65$, $WD = 0.2356$, $f = 1$, $f_4 = 1.221$
$r_1 = -0.3806$
$\quad d_1 = 0.7056 \quad n_1 = 1.757 \quad v_1 = 47.87$
$r_2 = -0.7942$
$\quad d_2 = 0.0115$
$r_3 = -8.5516$
$\quad d_3 = 0.2135 \quad n_2 = 1.48656 \quad v_2 = 84.47$
$r_4 = -0.9778$
$\quad d_4 = 0.0102$
$r_5 = 6.2374$
$\quad d_5 = 0.1172 \quad n_3 = 1.74077 \quad v_3 = 27.79$
$r_6 = 1.3626$
$\quad d_6 = 0.3189 \quad n_4 = 1.48656 \quad v_4 = 84.47$
$r_7 = -2.1415$
$\quad d_7 = 3.1970$
$r_8 = 3.5894$
$\quad d_8 = 0.3057 \quad n_5 = 1.4925 \quad v_5 = 81.9$
$r_9 = -3.7216$
$\quad d_9 = 0.0382$
$r_{10} = 2.1991$
$\quad d_{10} = 0.5732 \quad n_6 = 1.6180 \quad v_6 = 63.38$
$r_{11} = 2.3931$
$\quad d_{11} = 0.3150 \quad n_7 = 1.68065 \quad v_7 = 37.39$
$r_{12} = 1.0544$ wherein the reference symbols $r_1$ through $r_{12}$ represent radii of curvature on the surfaces of the respective lens elements, the reference symbols $d_1$ through $d_{11}$ designate thicknesses of the respective lens elements and airspaces therebetween, the reference symbols $n_1$ through $n_7$ denote refractive indices of the respective lens elements and the reference symbols $v_1$ through $v_7$ represent Abbe's number of the respective lens elements.

Figure 1:
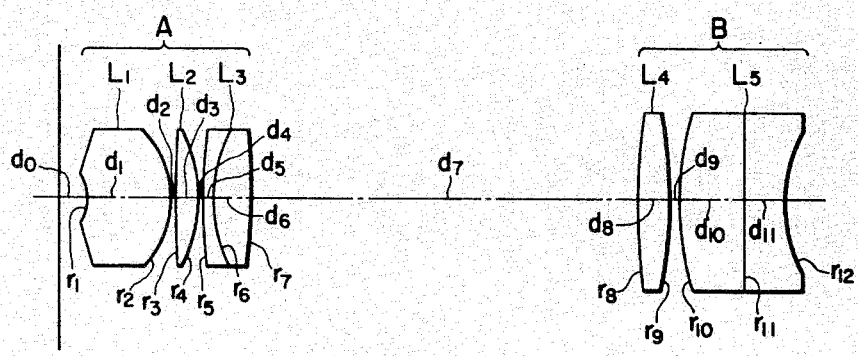
FIG. 1 shows a sectional view illustrating the composition of the Embodiment 1 of the present invention.
Figure 2:
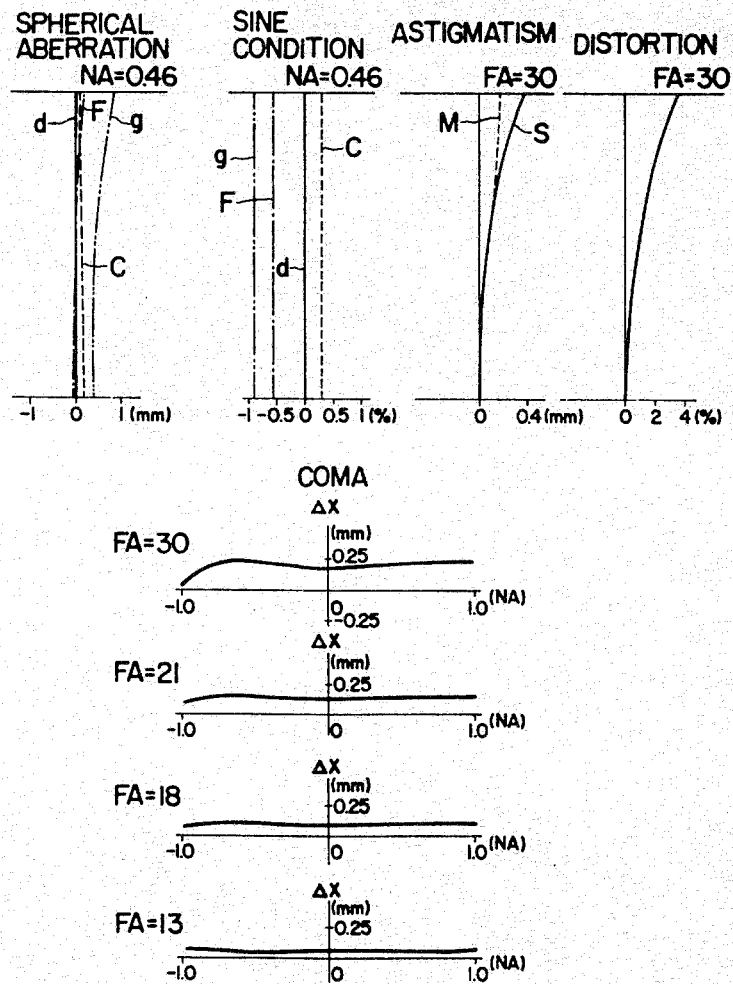
FIG. 2 shows curves illustrating the aberration characteristics of the Embodiment 1 of the present invention.
Figure 3:
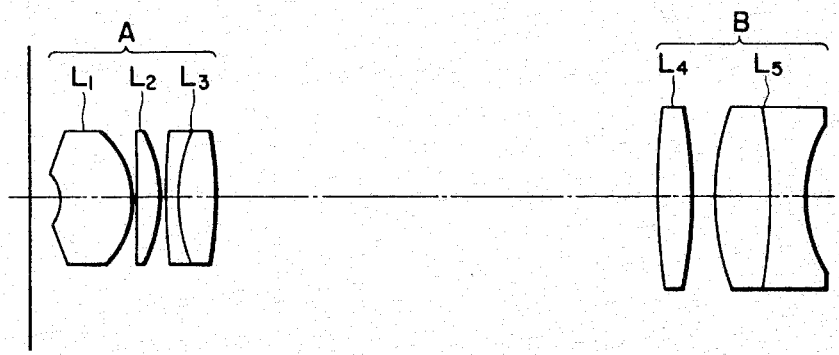
FIG. 3 illustrates a sectional view showing the composition of the Embodiment 2 of the present invention.
Figure 4:
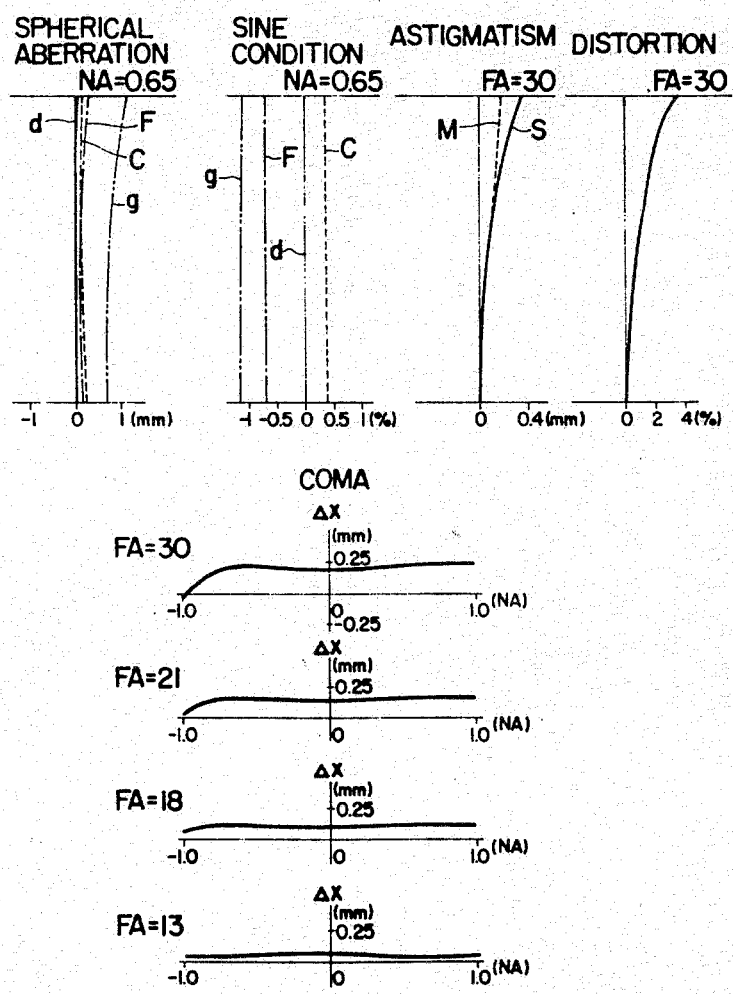
FIG. 4 illustrates graphs showing the aberration characteristics of the Embodiment 2.
Figure 5:
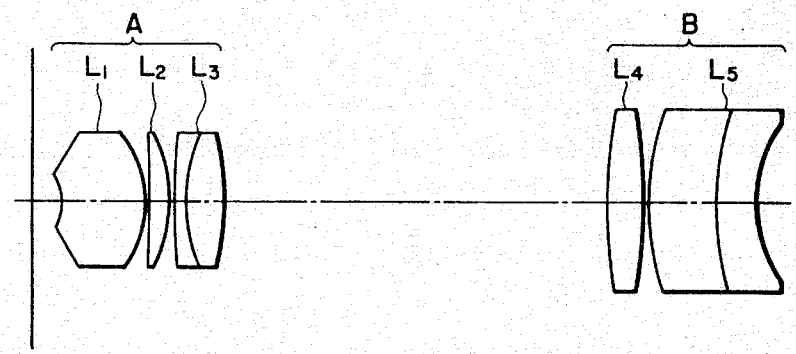
FIG. 5 shows a sectional view illustrating the composition of the Embodiment 3.
Figure 6:
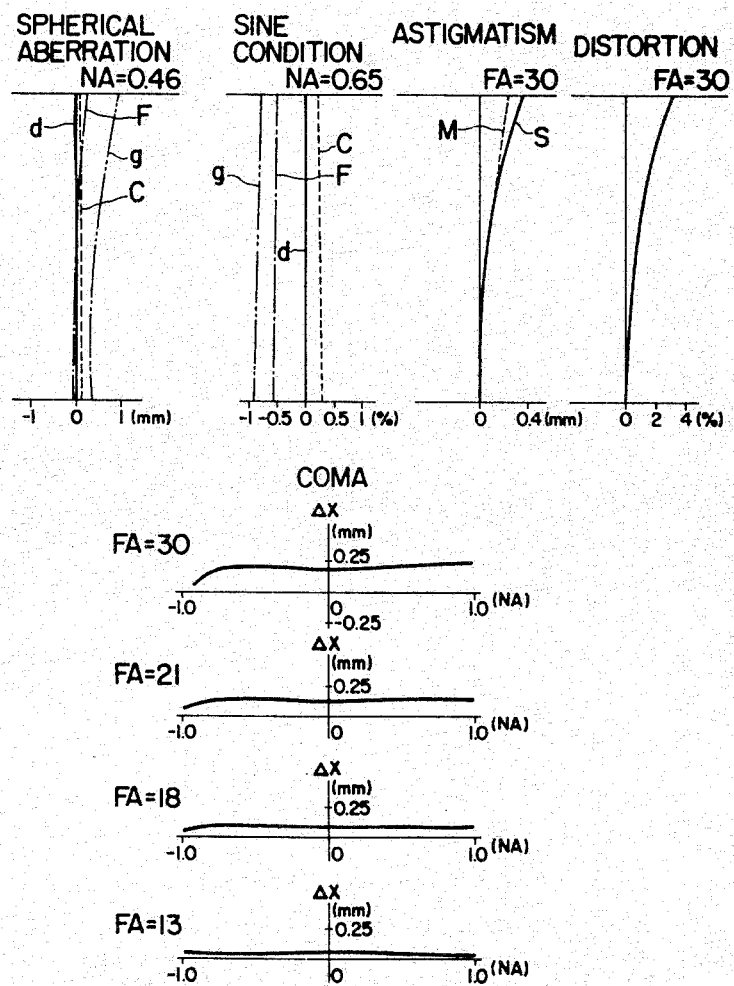
FIG. 6 shows graphs illustrating the aberration characteristics of the Embodiment 3.

Of the embodiments described above, the Embodiment 1 has such a composition as shown in FIG. 1. The Embodiment 2 is an objective lens system having such a composition as shown in FIG. 3 and comprises the first lens component $L_1$ which is made of a glass material having a low refractive power. In this lens system, spherical aberration is favorably corrected together with offaxial lateral aberration which is produced by the spherical aberration though it comprises the lens component $L_1$ which is made of a glass material having a low refractive index. Further, the Embodiment 3 is an objective lens system having such a composition as shown in FIG. 5 in which aberrations are favorably corrected even if the cemented surface is convex on the object side contrary to the cemented lens components arranged in the rear lens group B adopted in Embodiments 1 and 2 already described above.

As is clearly understood from the foregoing descriptions, the objective lens system according to the present invention has a sufficiently long working distance, a flat image plane and favorably corrected aberrations over a wide visual field.

I claim:

1. A wide-visual-field microscope objective lens system comprising a front lens group comprising a first negative meniscus lens component having a concave surface on the object side, a second positive lens component and a third positive cemented lens component, and a rear lens group comprising a fourth positive lens component and a fifth negative cemented lens component, said rear lens group is arranged widely apart from said front lens group and said lens system satisfying the following conditions:

(1) $2.8f \leq d_7$
(2) $0.3f \leq |r_1| \leq 0.39f$
(3) $0.85f \leq |r_{12}| \leq 1.2f$
(4) $1.1f \leq f_A \leq 1.25f$ wherein the reference symbol f represents focal length of the lens system as a whole, the reference symbol $f_A$ designates focal length of said front lens group as a whole, the reference symbol $r_1$ denotes radius of curvature on the object side surface of the first lens component, the reference symbol $r_{12}$ represents radius of curvature on the image side surface of the fifth lens component and the reference symbol $d_7$ designates the airspace formed between the front and rear lens groups.

2. A wide-visual-field microscope objective lens system according to claim 1 having the following numerical data:

| $\beta = 20X$, NA = 0.46, WD = 0.2422, | f = 1, $f_A$ = 1.131 |
|---|---|
| $r_1 = -0.3728$ | |
| $d_1 = 0.6951$  $n_1 = 1.7725$ | $\nu_1 = 49.6$ |
| $r_2 = -0.7076$ | |
| $d_2 = 0.0113$ | |
| $r_3 = 30.7899$ | |
| $d_3 = 0.2105$  $n_2 = 1.497$ | $\nu_2 = 81.6$ |
| $r_4 = -1.0993$ | |
| $d_4 = 0.0100$ | |
| $r_5 = 3.6804$ | |
| $d_5 = 0.1155$  $n_3 = 1.7618$ | $\nu_3 = 27.11$ |
| $r_6 = 1.1203$ | |
| $d_6 = 0.3145$  $n_4 = 1.497$ | $\nu_4 = 81.6$ |
| $r_7 = -4.9268$ | |
| $d_7 = 3.1525$ | |
| $r_8 = 4.9513$ | |
| $d_8 = 0.3014$  $n_5 = 1.497$ | $\nu_5 = 81.6$ |
| $r_9 = -3.0944$ | |
| $d_9 = 0.0628$ | |
| $r_{10} = 2.5059$ | |
| $d_{10} = 0.5401$  $n_6 = 1.6779$ | $\nu_6 = 55.33$ |
| $r_{11} = -86.2812$ | |
| $d_{11} = 0.3111$  $n_7 = 1.6134$ | $\nu_7 = 43.84$ |
| $r_{12} = 1.0903$ | | wherein the reference symbol $\beta$ represents magnification, the reference symbol NA designate numerical aperture, the reference symbol WD denotes working distance, the reference symbol f represents focal length of the lens system as a whole, the reference symbol $f_A$ designates total focal length of the front lens group as a whole, the reference symbol $r_1$ through $r_{12}$ denote radii of curvature on the surfaces of the respective lens elements, the reference symbols $d_1$ through $d_{11}$ represent thicknesses of the respective lens elements and airspaces therebetween, the reference symbols $n_1$ through $n_7$ designate refractive indices of the respective indices and the reference symbols $\nu_1$ through $\nu_7$ denote Abbe's numbers of the respective lens elements.

3. A wide-visual-field microscope objective lens system according to claim 1 having the following numerical data:

| $\beta = 20X$, NA = 0.46, WD = 0.2399, | f = 1, $f_A$ = 1.176 |
|---|---|
| $r_1 = -0.3237$ | |
| $d_1 = 0.6218$  $n_1 = 1.618$ | $\nu_1 = 63.38$ |
| $r_2 = -0.6681$ | |
| $d_2 = 0.0113$ | |
| $r_3 = 10.5599$ | |
| $d_3 = 0.2113$  $n_2 = 1.618$ | $\nu_2 = 63.38$ |
| $r_4 = -1.0320$ | |
| $d_4 = 0.0088$ | |
| $r_5 = 4.9815$ | |
| $d_5 = 0.1157$  $n_3 = 1.7618$ | $\nu_3 = 27.11$ |
| $r_6 = 1.1955$ | |
| $d_6 = 0.3145$  $n_4 = 1.4925$ | $\nu_4 = 81.9$ |
| $r_7 = -2.6466$ | |
| $d_7 = 3.6281$ | |
| $r_8 = 5.1483$ | |
| $d_8 = 0.3019$  $n_5 = 1.66672$ | $\nu_5 = 48.32$ |
| $r_9 = -3.6598$ | |
| $d_9 = 0.2126$ | |
| $r_{10} = 2.1028$ | |
| $d_{10} = 0.4076$  $n_6 = 1.58913$ | $\nu_6 = 61.11$ |
| $r_{11} = -4.2073$ | |
| $d_{11} = 0.3120$  $n_7 = 1.68065$ | $\nu_7 = 37.39$ |
| $r_{12} = 1.1062$ | | wherein the reference symbol $\beta$ represents magnification, the reference symbol NA designate numerical aperture, the reference symbol WD denotes working distance, the reference symbol f represents focal length of the lens system as a whole, the reference symbol $f_A$ designates total focal length of the front lens group as a whole, the reference symbols $r_1$ through $r_{12}$ denote radii of curvature on the surfaces of the respective lens elements, the reference symbols $d_1$ through $d_{11}$ represent thicknesses of the respective lens elements and airspaces therebetween, the reference symbols $n_1$ through $n_7$ designate refractive indices of the respective indices and the reference symbols $\nu_1$ through $\nu_7$ denote Abbe's numbers of the respective lens elements.

4. A wide-visual-field microscope objective lens system according to claim 1 having the following numerical data:

| $\beta = 20X$, NA = 0.65, WD = 0.2356, | f = 1, $f_A$ = 1.221 |
|---|---|
| $r_1 = -0.3806$ | |
| $d_1 = 0.7056$  $n_1 = 1.757$ | $\nu_1 = 47.87$ |
| $r_2 = -0.7942$ | |
| $d_2 = 0.0115$ | |
| $r_3 = -8.5516$ | |
| $d_3 = 0.2135$  $n_2 = 1.48656$ | $\nu_2 = 84.47$ |
| $r_4 = -0.9778$ | |
| $d_4 = 0.0102$ | |
| $r_5 = 6.2374$ | |
| $d_5 = 0.1172$  $n_3 = 1.74077$ | $\nu_3 = 27.79$ |
| $r_6 = 1.3626$ | |
| $d_6 = 0.3189$  $n_4 = 1.48656$ | $\nu_4 = 84.47$ |
| $r_7 = -2.1415$ | |
| $d_7 = 3.1970$ | |
| $r_8 = 3.5894$ | |
| $d_8 = 0.3057$  $n_5 = 1.4925$ | $\nu_5 = 81.9$ |
| $r_9 = -3.7216$ | |
| $d_9 = 0.0382$ | |
| $r_{10} = 2.1991$ | |
| $d_{10} = 0.5732$  $n_6 = 1.6180$ | $\nu_6 = 63.38$ |
| $r_{11} = 2.3931$ | |
| $d_{11} = 0.3150$  $n_7 = 1.68065$ | $\nu_7 = 37.39$ |
| $r_{12} = 1.0544$ | | wherein the reference symbol $\beta$ represents magnification, the reference symbol NA designate numerical aperture, the reference symbol WD denotes working distance, the reference symbol f represents focal length of the lens system as a whole, the reference symbol $f_A$ designates total focal length of the front lens group as a whole, the reference symbos $r_1$ through $r_{12}$ denote radii of curvature on the surfaces of the respective lens elements, the reference symbols $d_1$ through $d_{11}$ represent thicknesses of the respective lens elements and airspaces therebetween, the reference symbols $n_1$ through $n_7$ designate refractive indices of the respective indices and the reference symbols $\nu_1$ through $\nu_7$ denote Abbe's numbers of the respective lens elements.

* * * * *